June 1, 1965  A. SCHLESINGER ETAL  3,186,298
PORTABLE PROJECTOR WITH A SLIDE MAGAZINE
Filed Sept. 29, 1961  4 Sheets-Sheet 1

INVENTORS
Arnošt Schlesinger
Anton Horváth
By Richard Low
Agt.

June 1, 1965 A. SCHLESINGER ETAL 3,186,298
PORTABLE PROJECTOR WITH A SLIDE MAGAZINE
Filed Sept. 29, 1961 4 Sheets-Sheet 2

INVENTORS
Arnošt Schlesinger
Anton Horváth
By Richard Low
Agt

INVENTORS
Arnošt Schlesinger
Anton Horváth

United States Patent Office 3,186,298
Patented June 1, 1965

3,186,298
PORTABLE PROJECTOR WITH A
SLIDE MAGAZINE
Arnošt Schlesinger, Bratislava, and Anton Horváth, Nova
Ves pri Dunaji, Czechoslovakia, assignor to Meopta,
narodni podnik, Prerov, Czechoslovakia
Filed Sept. 29, 1961, Ser. No. 141,805
2 Claims. (Cl. 88—28)

The present invention relates to a portable projector with a slide magazine and deals more particularly with an apparatus of the aforementioned type intended for projecting small-size slides and comprising collapsible optical and operating members, which are arranged so as to reduce the dimensions of the apparatus for the purpose of transport or storage.

A slide projector is known, whose casing with the projecting system including a tiltably mounted objective carrier serving at the same time for manual control, is adapted for insertion into a protective casing consisting of two covering members, by means of a number of levers for the purpose of reducing the dimensions of the apparatus (U. S. Patent No. 2,573,088). In other known portable projectors the casing of the projection system as well as the projection screen are hinged to a wall of the portable box (German Patent No. 1,001,500). None of these appliances, however, is provided with a magazine or a mechanism for the exchange of slides. Moreover, the projection system, in some of the known projectors, does not comply with the requirements placed on an up-date projector.

Another type of projector is provided with a slide magazine which is slidably mounted in the casing enclosing the projection system and is equipped with a mechanism for the exchange of slides. Projectors of this type, however, are usually bulky and their size cannot be reduced unless a special adaptation is effected on the projecting systems. Such projectors cannot be termed portable projectors in the true sense of the word.

It is an object of the present invention to eliminate to a substantial degree the aforesaid disadvantages inherent in portable projectors which comprise collapsible optical and operating members and to simplify the design of the apparatus.

According to the invention the apparatus comprises a slide magazine adapted to be shifted into the casing of the projecting system parallel to the optical axis of a projection lens, comprising further a casing wall having a collapsible portion, which forms the lens holder, said wall portion being hinged adjacent to the projection aperture which in its operative position is associated with the magazine by means of a guide, such as a guiding rod adapted for cooperation with a sliding member and arranged for alternating movement of said sliding member, thereby effecting the exchange of slides.

The projector according to the invention is represented diagrammatically in two exemplary embodiments in the accompanying drawings, wherein FIGURE 1 is a cross-sectional view of a portable projector with a slide magazine in its operative position on one side of a projection system with an angular optical axis;

Figure 1:
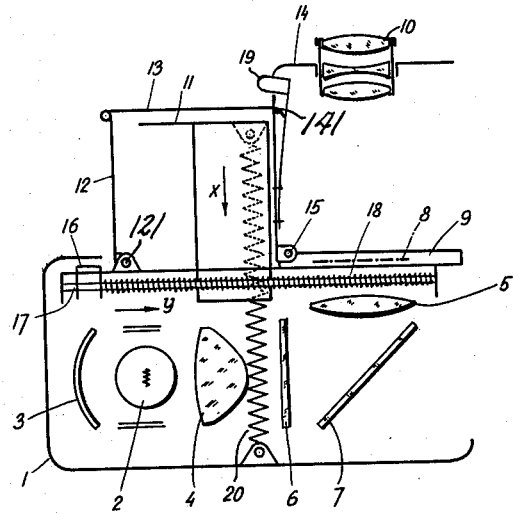

Referring first to FIGS. 1 to 4, a casing 1 houses the optical system comprising a projection lamp 2, a spherical reflecting mirror 3, a condenser including an aspherical lens 4 and a collecting lens 5 and a heat filter 6. Between the heat filter 6 and the collecting lens 5 is a reflecting mirror 7 reflecting the bundle of light rays through the slide 8 which is inserted in the projection aperture 9, and through the projection lens 10. The front part of the casing 1 carries a slide magazine 11 which is slidable between a wall section 12 and a first portion of a wall element 14 in the direction of the arrow X. The wall section 12, a wall section 13, and the wall element 14 are collapsible. There are pivotal connections between the wall section 12 and the casing 1 at 121, between the wall sections 12 and 13 at 131, between the wall section 13 and the wall element 14 at 141, and between the wall element 14 and the projection aperture part 9 at 15. In the operative position of the slide projector, the wall section 12 and the first portion of the wall element extend parallel to each other and substantially perpendicular to the front of the casing 1 while the wall section 13 extends parallel to the casing front. The wall element 14 which is also referred to hereinafter as a movable wall element includes further a second portion which serves as a holder for the lens 10.

The slides are successively fed from the slide magazine to the projection aperture by means of a sliding member 16 mounted on a guiding rod 17, said sliding member 16 being actuated manually against the force of a helical spring 18 in the direction of the arrow "Y." The movable wall element 14 is fixed in its position by a button 19. The wall sections 12 and 13 form, as has already been indicated, guides for the magazine 11 to slide therebetween. The magazine is urged toward its retracted position in the direction of the arrow "X" by means of a helical spring 20.

Figure 2:
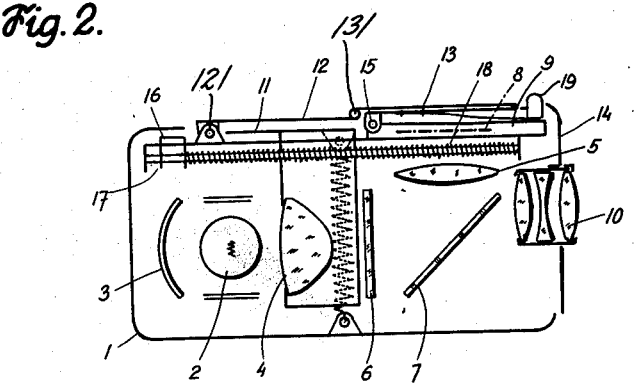
FIGURE 2 is a cross-sectional view showing the collapsed projector according to FIG. 1 in its position for transport.
Figure 3:
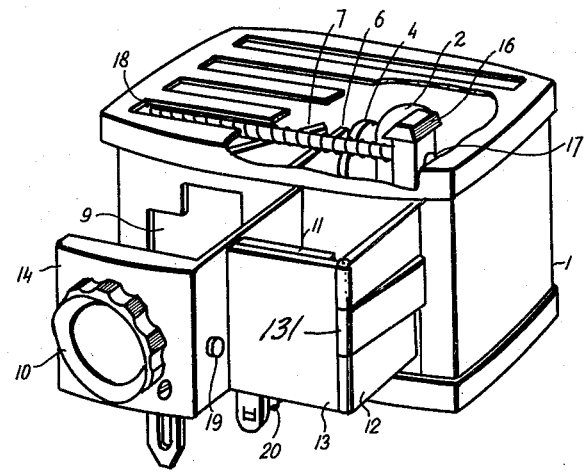
FIGURE 3 is a perspective view of the apparatus in its operative position according to FIGURE 1.
Figure 4:
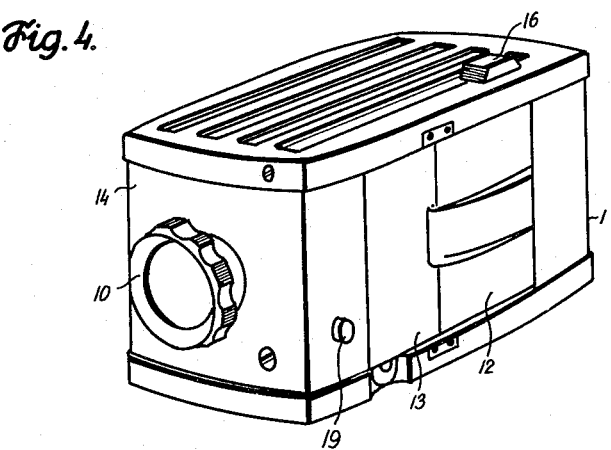
FIGURE 4 is a perspective view of the collapsed projector corresponding to FIG. 2.
Figure 5:
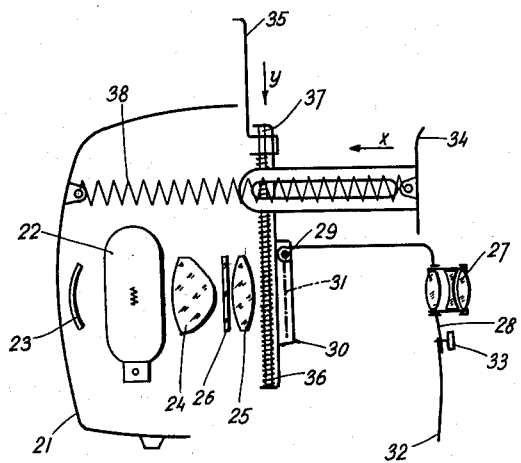
FIGURE 5 is a cross-sectional view of a modified arrangement of the projector with the slide magazine in operative position arranged above the optical system.

When the wall element 14 and the wall sections 12, 13 have been collapsed to a position illustrated in FIGS. 2 and 4, the projector is ready for transport or storage. The magazine 11 is then accommodated within the optical system, for example, in the vicinity of the aspherical lens 4 of the condenser.

According to the modified embodiment of the apparatus as shown in FIGS. 5 to 8, the magazine is arranged above the optical projection systems and the slides are displaced in vertical direction.

As shown in FIGS. 5 to 8, a casing 21 houses the optical system comprising a projection lamp 22, a reflecting mirror 23, a condenser consisting of an aspherical lens 24 and a collector lens 25, and a heat filter 26. The projection lens 27 is arranged on a collapsible holder 28 which is mounted for tilting movement at a projection aperture part 30 by means of a joint 29, said projection aperture 30 receiving a slide 31. Fixed to the lower part of the holder 28 is a support 32 secured in position by a set screw 33. The upper part of casing 21 carries a slide magazine 34, which can be displaced in the direction of the arrow "X" along the upper surface of the holder 28 to the projection aperture 30 by means of a slide member 35 actuated manually in the direction of the arrow "Y" against the force of a helical spring 36 mounted on a guiding rod 37. The slide magazine 34 is urged toward its retracted position within casing 21 by means of a helical spring 38 acting in the direction of the arrow "X."

Figure 6:
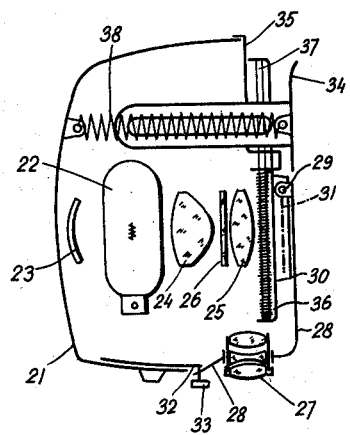
FIGURE 6 is a cross-sectional view of the collapsed projector according to FIG. 5, ready for transport.
Figure 7:
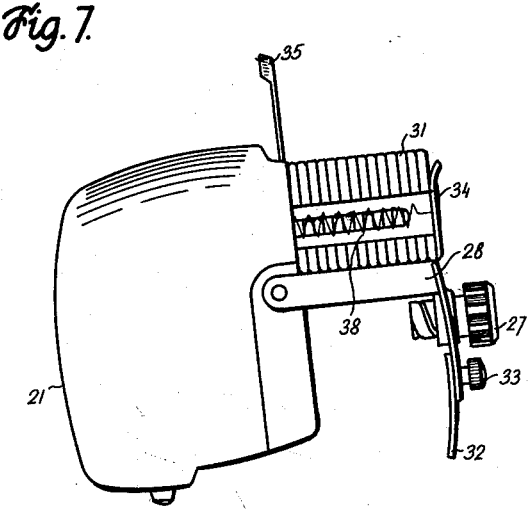
FIGURE 7 is a perspective view of the projector according to FIG. 5.
Figure 8:
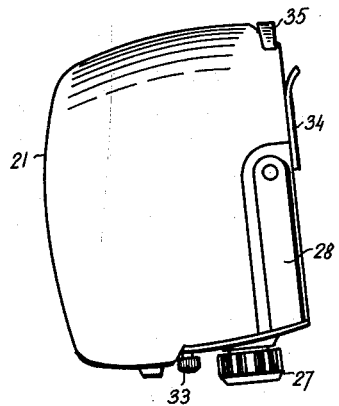
FIGURE 8 is a perspective view showing the collapsed projector corresponding to FIG. 6.

After collapsing the holder 28 of the projection lens 27, shifting of the magazine 34 into the upper part of the casing 21 by spring 38, and fixing the set screw 33 according to FIGS. 6 to 8, the projector is ready for transport or storage.

We claim:
1. A portable slide projector comprising
   a casing having a projection aperture located adjacent one end of the front thereof and including
      a movable wall element pivotally mounted to swing about an axis located on the front of said casing at the side of said aperture away from said one end for movement between an operative position and a storage and transport position, said wall element having first and second angularly related portions which respectively project forwardly from said front of the casing and extend parallel to said front at a distance from the latter in said operative position, and which respectively cover said aperture and form a side of said casing at said one end in said storage and transport position;
   an optical system including means within said casing for projecting a beam of light forwardly through said aperture thereby to illuminate a slide disposed in said aperture, and a projection lens carried by said second portion of the movable wall element to project an image of the illuminated slide when said wall element is in its operative position;
   a wall section pivotally mounted at the front of the casing to swing about an axis adjacent the other end of the latter, and being pivotally connected to said wall element to remain parallel to said first portion of the latter so that, when said wall element is in its operative position, said wall section also projects forwardly from the front of the casing;
   a slide carrier movable through the front of said casing between a retracted position in the latter and an extended position intermediate said wall section and said first portion of the wall element in said operative position of the latter so that said wall section and first portion of the wall element act to laterally guide a supply of slides on said carrier;
   and feeding means operative to move the rearmost slide on said carrier from the latter into said projection aperture.

2. A portable slide projector as in claim 1;
   further comprising spring means acting on said slide carrier to urge the latter rearwardly to said retracted position in the casing; and
   wherein said feeding means includes a guide rod extending laterally across said front of the casing, a pusher movable along said guide rod across said slide carrier to said projection aperture, and spring means urging said pusher in the direction away from said projection aperture.

References Cited by the Examiner
UNITED STATES PATENTS

| | | | |
|---|---|---|---|
| 1,318,541 | 10/19 | Campbell | 88—26 |
| 1,521,122 | 12/24 | Newman | 88—26 |
| 2,487,862 | 11/49 | Gardner | 88—28 |
| 2,496,647 | 2/50 | Woodbury | 88—26 |
| 2,573,088 | 10/51 | Zillmer | 88—26 |
| 3,029,692 | 4/62 | Mulch | 88—26 |

NORTON ANSHER, *Primary Examiner.*
WILLIAM MISIECK, *Examiner.*